United States Patent
Yarlagadda et al.

(10) Patent No.: US 7,821,953 B2
(45) Date of Patent: Oct. 26, 2010

(54) DYNAMICALLY SELECTING CODECS FOR MANAGING AN AUDIO MESSAGE

(75) Inventors: Madhu Yarlagadda, Los Altos, CA (US); Ramkumar Ramani, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 915 days.

(21) Appl. No.: 11/129,666

(22) Filed: May 13, 2005

(65) Prior Publication Data
US 2006/0256810 A1 Nov. 16, 2006

(51) Int. Cl.
*H04L 12/26* (2006.01)
*H04L 1/00* (2006.01)

(52) U.S. Cl. .............. 370/252; 370/247; 370/241; 370/253

(58) Field of Classification Search .............. 370/465, 370/241, 328, 477; 704/230
See application file for complete search history.

(56) References Cited

U.S. PATENT DOCUMENTS

| | | | | |
|---|---|---|---|---|
| 4,352,182 | A * | 9/1982 | Billi et al. .............. | 714/714 |
| 4,384,278 | A * | 5/1983 | Benjamin .............. | 341/108 |
| 6,567,419 | B1 | 5/2003 | Yarlagadda | |
| 6,901,080 | B1 * | 5/2005 | Beyda et al. .............. | 370/469 |
| 6,934,278 | B1 * | 8/2005 | Champa et al. .............. | 370/352 |
| 6,968,309 | B1 * | 11/2005 | Mäkinen et al. .............. | 704/219 |
| 2003/0014488 | A1 * | 1/2003 | Dalal et al. .............. | 709/204 |
| 2004/0032860 | A1 | 2/2004 | Mundra et al. | |
| 2004/0160979 | A1 | 8/2004 | Pepin et al. | |

FOREIGN PATENT DOCUMENTS

| | | |
|---|---|---|
| EP | 1 161 038 A2 | 12/2001 |
| WO | WO-01/78430 | 10/2001 |

OTHER PUBLICATIONS

ITU G.722.2, "Series G: Transmission Systems and Media, Digital SYstems and Networks", Jul. 2003, ITU, all pages.*
ITU-T H.225, "Infrastructure of Audiovisual Services—Transmission Multiplexing and Synchronization", Jul. 2003, ITU-T, all pages.*

* cited by examiner

*Primary Examiner*—Kwang B Yao
*Assistant Examiner*—Adam Duda
(74) *Attorney, Agent, or Firm*—Fommer Lawrence & Haug LLP; David W. Foster (57) ABSTRACT

A system, method, and apparatus are directed towards a system, method, and apparatus for managing a communication session by dynamically selecting a CODEC. A client device requests a communication session with a receiver device. If available, historical information may be used to establish an initial CODEC and its associated sampling frequency for the communication session. Signals, such as a white noise signal, and/or a ring tone may be sent between the client device and the receiver to determine a metric for the communication session. The metric may be used to adjust the CODEC and/or its sampling frequency for the communication session. In one embodiment, if it is determined that the sampling frequency is less than a minimum determined value, a message may be sent to the client device advising that the current communication session be terminated.

26 Claims, 6 Drawing Sheets

DYNAMICALLY SELECTING CODECS FOR MANAGING AN AUDIO MESSAGE

FIELD OF THE INVENTION

The present invention relates generally to network communications, and more particularly, but not exclusively, to a system and method for dynamically selecting a COmpression/DECompression (CODEC) and its associated sampling frequency, for use in managing an audio message.

BACKGROUND OF THE INVENTION

IP Telephony, also known as Voice over Internet Protocol (VOIP), is a technology that makes it possible to have a voice conversation over a dedicated IP network, such as the Internet, instead of a dedicated voice transmission line.

Depending on the service, one way to place a VOIP call is to employ specialized phones, sometimes called IP Phones, or VOIP phones, that may look like a normal phone. Such VOIP phones may connect to the network through an RJ-45 connector, or operate through a wireless connection.

Because VOIP make it possible to have voice conversations over IP networks, VOIP allows for a cost effective alternative to the traditional public switched telephone networks (PSTNs). Because of its relatively lower costs and ease of use, VOIP phone services have been rapidly increasing in popularity. With such an increase in popularity, there has been an increased desire to be able to integrate at least some of the VOIP features with a variety of other communication services.

However, because IP does not by default provide any mechanism to ensure that data packets are delivered in sequential order, or provide any quality of service guarantees, many implementations of VOIP face problems dealing with latency and/or possible data integrity issues. Another problem with at least some of the VOIP implementations is that they may be unable to provide VOIP traffic through firewalls, network address translation (NAT) devices, and the like. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards a system, method, and apparatus for dynamically selecting a CODEC and/or its associated sampling frequency for use in communication session. A client device is configured to request a communication session with a receiver device. If the client device and receiver device has conducted a prior communication session, historical data may be used to establish an initial CODEC and its associated sampling frequency for the communication session. In an absence of historical data between the client device and the receiver device, a default CODEC and sampling frequency, may be employed. A pre-selected signal may then be sent between the client device and the receiver device to determine a metric for the communication session. In one embodiment, the pre-selected signal approximates white noise. Moreover, in another embodiment, a ring tone sent from the receiver device to the client device may also be used to further determine the metric associated with the communication session. The metric may include any of a variety of metrics, including a packet loss, packet drop rate, packet latency, and the like. The metric may be employed to adjust the CODEC's sampling frequency bandwidth, compression complexity, or the like, select a different CODEC, or the like, for the communication session. In one embodiment, if it is determined that the sampling frequency, bandwidth, compression complexity, or the like, is less than a minimum value for the selected CODEC, a message may be sent to the client device advising that the communication session be altered. By employing such signals, an optimal CODEC and sampling frequency for the communication session may be determined prior to an end-user sending data.

In one embodiment of the invention, the dynamic selection of the CODEC and sampling frequency and compression complexity are performed by the client device requesting the communication session. In another embodiment, the requesting client device employs information from another device, such as a server, to dynamically select the CODEC and its sampling frequency, bandwidth, compression complexity, or the like. For example, historical data may be stored at the server, and provided to the client device for use in dynamically selecting an initial CODEC and/or its sampling frequency, bandwidth, compression complexity, or the like.

Although the following is described in terms of an audio communications, the invention is not so limited. For example, dynamic selection of the CODEC as described within, may be employed for any of a variety of other message types that employ data compression, including voice messages, IM messages, streaming data, video messages, and the like.

Illustrative Operating Environment

Figure 1:
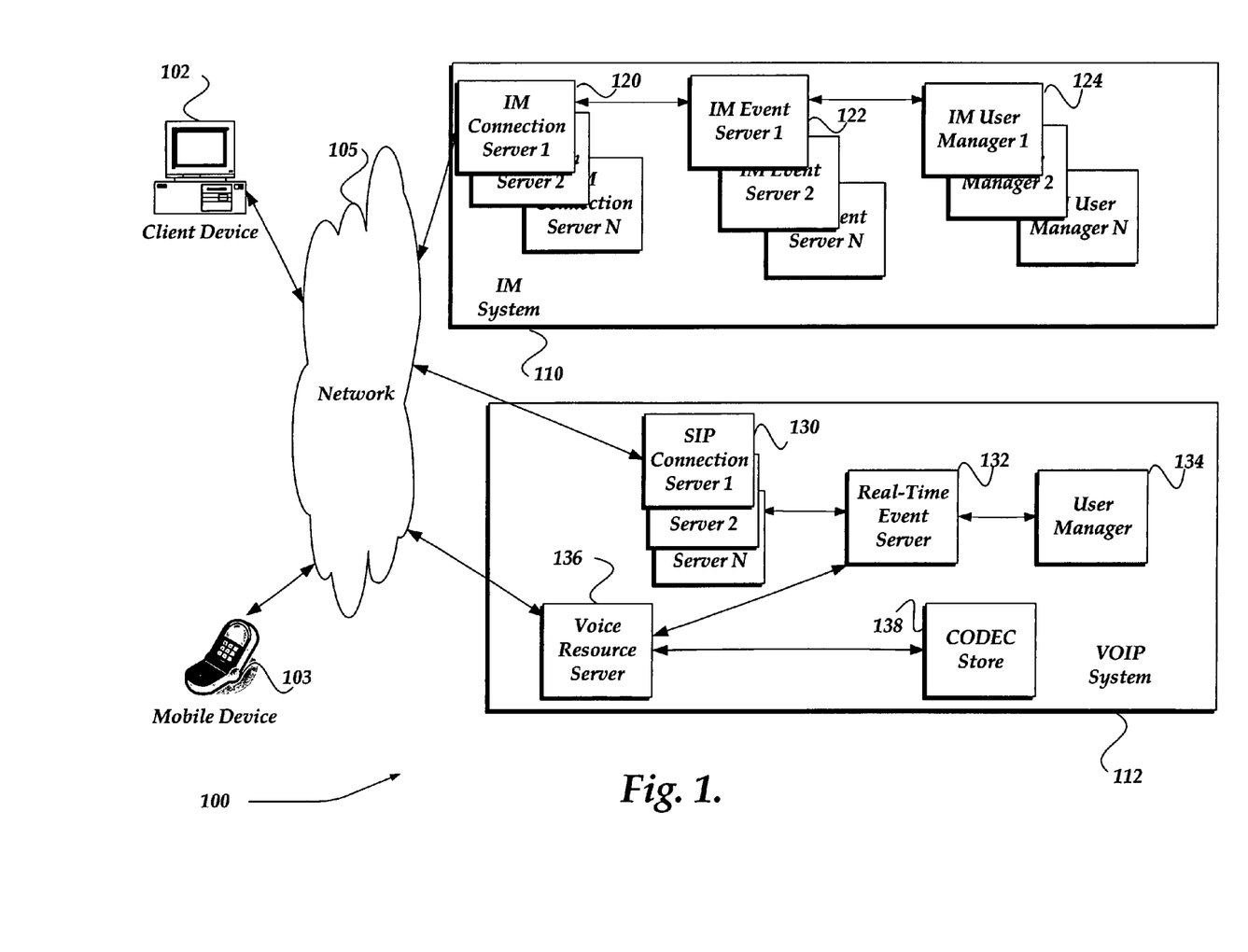
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client device 102, mobile device 103, network 105, IM system 110, and VOIP system 112. IM system 110 may include IM connection servers 120, IM event servers 122, and IM user managers 124. VOIP system 112 includes SIP connection servers 130, Real-time event server 132, user manager 134, voice resource server (VRS) 136, and CODEC store 138.

Client device 102 is in communication with IM connection servers 120 and SIP connection servers 130, through network 105. Mobile device 103 is in communication with IM connection servers 120 and SIP connection servers 130 through network 105. IM event servers 122 are in communication with IM connection servers 120 and IM user managers 124. Real-time event server 132 is in communication with SIP connection servers 130, VRS 136, and user manager 134.

Mobile device 103 may include virtually any device that is arranged to send and receive media communications and messages such as VOIP messages via one or more wired and/or wireless communication interfaces. For example, mobile device 103 may be configured to send and/or receive audio messages between client device 102.

Typically, mobile device 103 may be configured to communicate using any of a variety of protocols. For example, mobile device 103 may be configured to employ RTP for communicating media data such as audio and video to another device. However, the invention is not so limited, and another media data mechanism may be employed, including IAX, and the like. Mobile device 103 may also employ the SIP protocol for enabling setting up a session and enabling such actions as dialing a number, enabling a ring, a ring-back tone, busy signal, and the like. However, other signaling protocols may also be employed, including H.323, Skinny Client Control Protocol (SCCP), IAX, MiNET, and the like. Typically, however, mobile device 103 may employ SIP over either UDP or TCP and RTP over UDP.

Mobile device 103 may also be configured to provide an identifier, sometimes known as an originating line identifier (OLI) during a communication. The identifier may employ any of a variety of mechanisms, including a device model number, a carrier identifier, a mobile identification number (MIN), and the like. The MIN may be a telephone number, a Mobile Subscriber Integrated Services Digital Network (MS-ISDN), an electronic serial number (ESN), or other device identifier. The OLI may also be an IP address associated with Mobile device 103. In one embodiment, the identifier is provided with each communication. In another embodiment, the identifier is provided by an end-user.

Devices that may operate as mobile device 103 include personal laptop computers, portable communication's devices, smart phones, Personal Digital Assistants (PDAs), handheld computers, programmable consumer electronics, standard telephones configured with an analog telephone adaptor (ATA), an IP phone, a mobile device, and the like.

One embodiment of client device 102 is described in more detail below in conjunction with FIG. 2. Briefly, however, client device 102 may include virtually any computing device capable of receiving and sending a message over a network. The set of such devices may include devices that typically connect using a wired communications medium such as personal computers, desktop computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client device 102 may be any device that is capable of connecting using a wired or wireless communication medium such as a PDA, POCKET PC, wearable computer, and any other device that is equipped to communicate over a wired and/or wireless communication medium.

Client device 102 may be further configured to receive a VOIP message in one format and to provide the message over network 105 in another format to a remote device such as IM connection servers 120, SIP connection servers 130, and the like.

Client device 102 may be configured to employ SIP connection servers 130, and VRS 136 to establish a communications, such as an audio communications with mobile device 103, as described in more detail below.

Client device 102 may be configured to request a communication session between itself and another device. Client device 102 may then select an initial CODEC and sampling frequency, bandwidth, compression complexity, or the like, for use in the communication session. Client device 102 may, for example, select the initial CODEC, sampling frequency, bandwidth, compression complexity, or the like, based, at least in part, on historical data. Client device 102 may then determine a metric for the communication session and dynamically select a different CODEC, and/or sampling frequency based on the metric. In one embodiment, client device 102 may determine the metric based on sending a pre-selected signal between itself and the other device, and collecting such metrics, as packet loss, packet drop rate, packet latency, jitter, and the like. Client device 102 may further determine the metric based on additional mechanisms, including receiving a ring back tone, or the like, from the other device, and measuring a metric associated with the ring back tone. If client device 102 determines that a sampling frequency is below a predetermined minimum value, client device 102 may provide indication that the communication session might be terminated.

Client device 102 may further be configured to dynamically select the CODEC and/or its sampling frequency based on any of a variety of other information associated with a communication session. Thus, for example, client device 102 may also dynamically select the CODEC and/or its sampling frequency based on a message type, including voice mail, VOIP, IM, PSTN accesses, and the like; a network type, including broadband, narrowband, and the like; as well as a network condition.

It should be noted, however, the dynamic selection of a CODEC and/or its associated sampling frequency may also be performed by the another computing device associated with the communication session, including mobile device 103, an intermediate server, or the like, without departing from the scope or spirit of the invention.

Moreover, client device 102 (and/or mobile device 103) may receive information from another device, such as VRS 136, that is used to change from one CODEC format to another in case the destination does not support the CODEC type sent by the source. However, in one embodiment, VRS 136 may be configured to select the CODEC for use by client device 102 (and/or mobile device 103), without departing from the scope or spirit of the invention.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 may include any communication method by which information may travel between computing devices.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

IM system 110 is configured to manage IM sessions between client devices employing an IM client. IM system 110 may employ IM connection servers 120, IM event servers 122, and IM user managers 124 to manage one or more IM sessions. In one embodiment, IM connection servers 120, IM event servers 122, and IM user managers 124 may represent separate server processes operating with a single computing device. In another embodiment, IM connection servers 120, IM event servers 122, and IM user managers 124 may represent distinct processes operating across multiple computing devices. As such, IM system 110 may be implemented on a variety of computing devices including personal computers, desktop computers, multiprocessor systems, microprocessor-based devices, network PCs, servers, network appliances, and the like.

IM connection servers 120 are configured to receive a request to establish an IM session from an IM client, such as might be included within client device 102, Mobile device 103, and the like. IM connection servers 120 may also receive from the IM client authentication information that may be employed to authenticate an end-user of the IM client. If the end-user is authenticated, IM connection servers 120 may enable the IM client to log into the IM session. IM connections servers 120 may also be configured to provide information about the established session to IM event servers 122.

IM connections servers 120 may also forward various request information from the IM client to IM event servers 122. Such request information may include, for example, a request to locate and communicate with another IM end-user.

IM event servers 122 are configured to receive the end-user's log in and other request information from IM connections servers 120. IM event servers 122 may request IM user managers 124 to store information about the IM client and end-user. IM user mangers 124 may employ a table, spreadsheet, file, database, and the like, to register the IM client, and on which IM connection server, within IM connection servers 120, the IM client is logged into. Thus, IM user managers 124 may store information about various IM conversations that may include such information as identifiers for end-users associated with an IM conversation, time information, account identifiers for the end-users, IM connection servers associated with an IM conversation, and so forth. As such, IM event servers 122 may also employ IM user managers 124 to determine which IM connection server, within IM connection servers 122, another end-user is logged into, and provide such information to IM connection servers 120, so that an IM session may be established between two or more IM end-users.

VOIP system 112 is configured to manage VOIP sessions, and other real-time communications between client devices using any of a variety of VOIP protocols. VOIP system 112 is further configured to enable a variety of client devices and client applications to access voice mail messages. Thus, VOIP system 112 may also be configured to enable a real-time message to be communicated as an audio message, voice message, graphics message, streaming message, or the like.

As shown, VOIP system 112 may be implemented in a single computing device, with each of the illustrated components operating as one or more processes with the single computing device. VOIP system 112 may also be implemented across multiple computing devices, with one or more of the illustrated components distributed across the multiple computing devices. As such VOIP system 112 may be implemented on a variety of computing devices including personal computers, desktop computers, multiprocessor systems, microprocessor-based devices, network PCs, servers, network appliances, and the like.

SIP connection servers 130 are configured to receive a request to establish a SIP connection from client device 102, mobile device 103, and the like. The requesting device may provide identification information to SIP connection servers 130 that may be used, at least in part, to authenticate the request to establish the SIP connection. If the requesting device is authenticated, SIP connection servers 130 may enable the requesting device to log into a connection. SIP connection servers 130 may also provide information about the requesting device to real-time event server 132. Real-time event server 132 may be configured to receive the information and provide it to user manager 134 for storage.

User manager 134 may store the information in a database, spreadsheet, table, file, and the like. Such information may include, for example, an identifier associated with the requesting device, an end-user associated with the requesting device, an address associated with SIP connection servers 130, and the like. User manager 134 may receive and manage such information for a plurality of requesting device. User manager 134 may also provide information to real-time event server 132 about at least one other requesting device, such that SIP connection servers 130 may enable a VOIP communication between one or more end-user devices. In one embodiment, the one or more end-user devices may employ VRS 136 to manage the metric of the VOIP communications between them.

One embodiment may have the local client interact directly with the destination client. In such an interaction the clients may exchange existing network conditions which could include packet loss, available bandwidth, or the like. Based on these conditions the clients could select an optimal CODEC. In order to ensure the CODEC selection process happens accurately the clients could also transmit look ahead information such as a silence, ring back tone, or the like. Based on the data sent each client may then measure an associated packet loss.

As an example if Client "A" is sending too much data to client "B" which might be on a dialup connection. In such a case the client "B" may send to client "A" a report that includes available bandwidth, packet loss and jitter that it is noticing. Based on this information the client "A" may adjust the CODEC to be either lower or higher in quality, bandwidth, compression, or the like, to provide a most optimal experience.

In the event Client "A" may not send the data in a format that is acceptable by "B," then client "A" may use relay server VRS 136 that is capable of converting one format to another. Such format conversion may change in CODEC type, format of the protocol packet, compression, or the like.

In one embodiment VRS 136 may store historical data about a previously selected CODEC, metrics, and the like, for a prior communication session between the computing devices. However, the invention is not so limited, and the computing devices may also include a historical store for substantially similar information.

Devices that may operate as VRS 136 include personal computers, desktop computers, multiprocessor systems, microprocessor-based or programmable consumer electronics, network PCs, servers, firewalls, gateways, network address translators, bridges, routers, and the like.

CODEC store 138 includes virtually any mechanism for storing and managing CODECS for use in compressing/decompressing a message, including audio messages, voice messages, streaming messages, text messages, video messages, and the like. For example, CODEC store 138 may include a folder, a directory, a database, a repository, and the like. Moreover, CODEC store 138 may include virtually any CODEC, including G.711, G.723, G.726, G.728, G.729, G.729a, H.323, iSAC, Speex, and the like. CODEC store 138 may also include CODECS useable for other message formats, including MPEG, AIFF, AU, MP3, ACELP, AVI, WMV, H.261, H.263, and the like. CODEC store 138 may include various supported CODECs. If the client does not have a CODEC installed it could contact CODEC store 138 to fetch a new CODEC.

Illustrative Client Device

Figure 2:
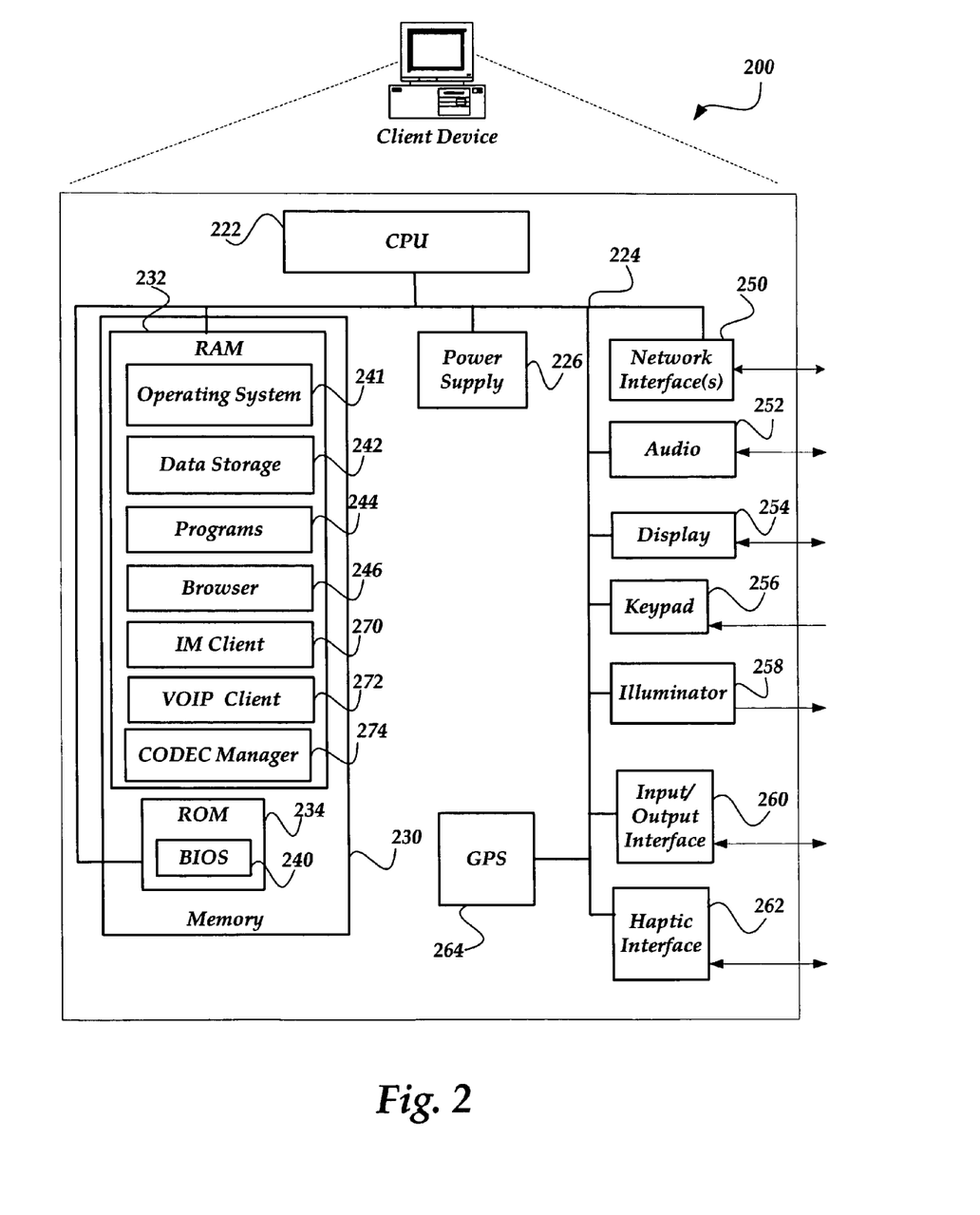
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 242, which can be utilized by client device 200 to store, among other things, programs 244 and/or other data. For example, data storage 242 may also be employed to store information that describes various capabilities of client device 200. The information may then be provided to another device based on any of a variety of events, including being sent as part of a header during a communication, sent upon request, and the like.

Programs 244 may include computer executable instructions which, when executed by client device 200, transmit, receive, and/or otherwise process messages (e.g., SMS, NMS, IM, email, and/or other messages), audio, video, and enable telecommunication with another user of another client device. Other examples of application programs include calendars, contact managers, task managers, transcoders, database programs, word processing programs, spreadsheet programs, games, CODEC programs, and so forth. In addition, mass memory 230 stores browser 246, IM client 270, VOIP client 272, and CODEC manager 274.

Browser 246 may be configured to receive and to send web pages, web-based messages, and the like. Browser 246 may, for example, receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

IM client 270 may be configured to initiate and manage an instant messaging session, including, but not limited to AOL Instant Messenger, Yahoo! Messenger, .NET Messenger Server, ICQ, and the like. In one embodiment, IM client 270 is configured to employ a VOIP client, such as VOIP client 272 to integrate IM/VOIP features. Thus, in one embodiment, IM client 270 may employ SIP to establish media sessions with another computing device employing an IM/VOIP capable client, and RTP to communicate the media traffic. However IM client 270 is not so limited. For example, IM client 270 may also employ any of the following SIMPLE (SIP for Instant Messaging and Presence Leverage), APEX (Application Exchange), Prim (Presence and Instant Messaging Protocol), the open XML-based XMPP (Extensible Messaging and Presence Protocol), more commonly known as Jabber and OMA (Open Mobile Alliance)'s IMPS (Instant Messaging and Presence Service) created specifically for mobile devices, and the like.

VOIP client 272 is configured to enable client device 200 to initiate and manage a VOIP session with another client device. VOIP client 272 may employ the SIP protocol for managing signaling, and RTP for transmitting the VOIP traffic ("media"). However, the invention is not so constrained, and any of a variety of other VOIP protocols may be employed including IAX which carries both signaling and voice data, H.323, SCCP, Megaco, MGCP, MiNET, Skinny Client Control Protocol (SCCP), and the like. VOIP client 272 is further configured to employ virtually any CODEC to compress the data for communicating it over the network, including G.711, G.729, G.729a, iSAC, Speex, and the like.

CODEC manager 274 is configured to dynamically select a CODEC and/or its associated sampling frequency for use during a communication session. In one embodiment, CODEC manager 274 is configured to dynamically select the CODEC for use in compressing audio messages such as employed by VOIP client 272. However, CODEC manager 274 may also dynamically select a CODEC for any of a variety of other message types, including video messages, IM messages, PSTN messages, and the like. As such, CODEC manager 274 may be configured to dynamically select virtually any CODEC including G.711, G.723, G.726, G.728, G.729, G.729a, H.323, iSAC, Speex, MPEG, AIFF, AU, MP3, ACELP, AVI, WMV, H.261, H.263, and so forth.

CODEC manager 274 may communicate with VOIP client 272, IM client 270, or the like to initially request a communication session with another computing device, herein called the receiver device. CODEC manager 274 may then select an initial CODEC along with its associated sampling frequency. In one embodiment, CODEC manager 274 may employ historical data about a prior communication session with the receiver device, to initially select the CODEC. The historical data may be obtained from a server device; however, the invention is not so constrained. For example, the historical data may also be available on client device 200.

CODEC manager 274 may then communicate with another component of client device 200, to have a signal sent to the receiver device for use in determining a metric associated with the communication session. In one embodiment, the signal is configured to approximate white noise The metric may include any of a variety of metrics, including a packet loss, packet drop rate, latency, jitter, and the like. CODEC manager 274 may also employ a variety of other metrics to dynamically select the CODEC and/or its sampling frequency, including a message type, a network type, and the like. CODEC manager 274 may, or example, receive from the receiver device a ring tone back that is employable to determine the metric.

CODEC manager 274 may employ the metrics to dynamically select the CODEC before an end-user communicates actual data between the receiver device and itself. Thus, in one embodiment, CODEC manager 274 may determine the CODEC and sampling frequency during about a setup phase associated with setting up the communication session. For example, the setup phase may, for example, be considered to end at about when the communication session is configured to enable an end-user to talk, send an audio message, an IM message, or other form of communication. In a case where the communication session represents a voice communication session, the setup phase may be considered to end after an end-user, answering service, or the like, responds to the ring. However, the invention is not so limited, and dynamic selection of the CODEC and/or sampling frequency may also extend beyond the setup phase for the communication session, without departing from the scope or spirit of the invention.

In one embodiment, if CODEC manager 274 determines that the dynamically selected CODEC's sampling frequency is less than a predetermined minimum, CODEC manager 274 may advice the end-user of client device 200 that the communication session be terminated. CODEC manager 274 may employ processes such as those described below in conjunction with FIGS. 4-6 to perform at least some of its actions.

While CODEC manager 274 is illustrated as a separate component, the invention is not so limited. For example, CODEC manager 274 may be integrated within another component of client device 200, including IM client 270, VOIP client 272, browser 246, or the like, without departing from the scope or spirit of the invention.

Although not shown, client device 200 may also be configured to receive a message from another computing device, employing another mechanism, including, but not limited to email, Short Message Service (SMS), Multimedia Message Service (MMS), internet relay chat (IRC), mIRC, and the like.

Illustrative Server Environment

Figure 3:
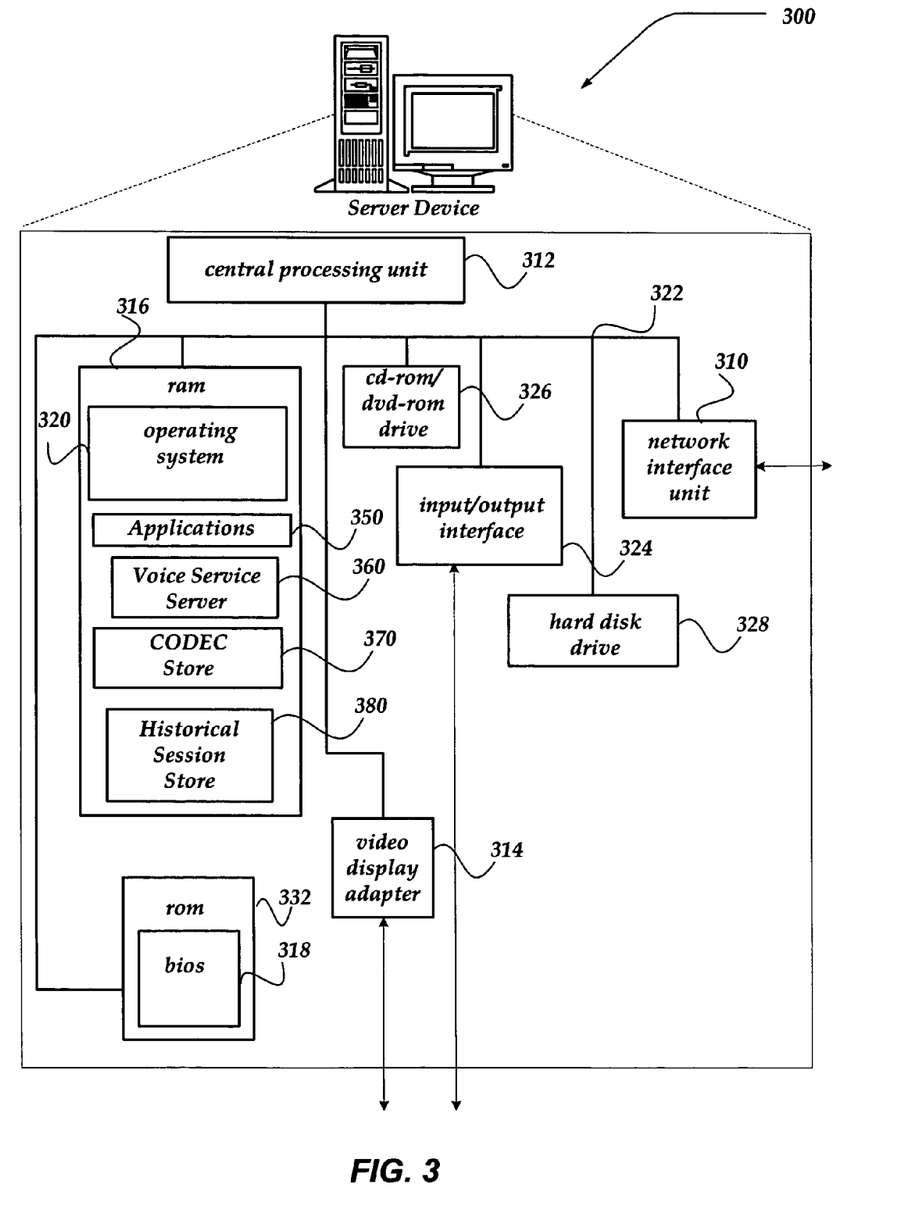
FIG. 3 shows one embodiment of a server device that may be included in a system implementing the invention.

FIG. 3 shows one embodiment of a server device, according to one embodiment of the invention. Server device 300 may include many more components than those shown. The components shown, however, are sufficient to disclose an illustrative embodiment for practicing the invention. Server device 300 may, for example, VRS 136 of FIG. 1.

Server device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of server device 300. Any general-purpose operating system may be employed. Basic input/output system ("BIOS") 218 is also provided for controlling the low-level operation of server device 300. As illustrated in FIG. 3, server device 300 also can communicate with the Internet, or some other communications network, such as network 105 in FIG. 1, via network interface unit 310, which is constructed for use with various communication protocols including the TCP/IP protocol. Network interface unit 310 is sometimes known as a transceiver, transceiving device, network interface card (NIC), and the like.

Server device 300 may also include an SMTP handler application for transmitting and receiving email. Server device 300 may also include an HTTP handler application for receiving and handing HTTP requests, and an HTTPS handler application for handling secure connections. The HTTPS handler application may initiate communication with an external application in a secure fashion.

Server device 300 also includes input/output interface 324 for communicating with external devices, such as a mouse, keyboard, scanner, or other input devices not shown in FIG. 3. Likewise, server device 300 may further include additional mass storage facilities such as CD-ROM/DVD-ROM drive 326 and hard disk drive 328. Hard disk drive 328 is utilized by server device 300 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs include email programs, schedulers, calendars, transcoders, database programs, word processing programs, spreadsheet programs, and so forth. Mass storage may further include applications such as voice server 360, CODEC store 370, and historical session store 380.

CODEC store 370 may be configured substantially similar to CODEC store 138 of FIG. 1. Thus, CODEC store 370 may include any of a variety of CODECS for use in compressing/decompressing a variety of message types, including audio messages, video messages, IM messages, and the like.

Historical session store 380 is configured to store and manage historical data associated with a communication session between computing devices. Such historical data includes, but is not limited to information about, the computing devices associated with the communication session, about the dynamically selected CODEC, its associated sampling frequency, a metric including a metric, a message type, a connection type, and the like. The historical data may be made available to a requesting computing device, such as client device 102, mobile device 103, and the like, of FIG. 1. Moreover, historical session store 380 may receive the historical data from the requesting computing device, such as client device 102, mobile device 103, and the like. Historical session store 380 may be implemented by any of a variety of mechanisms, including a folder, a spreadsheet, a database, document, and the like.

Generalized Operation

Figure 4:
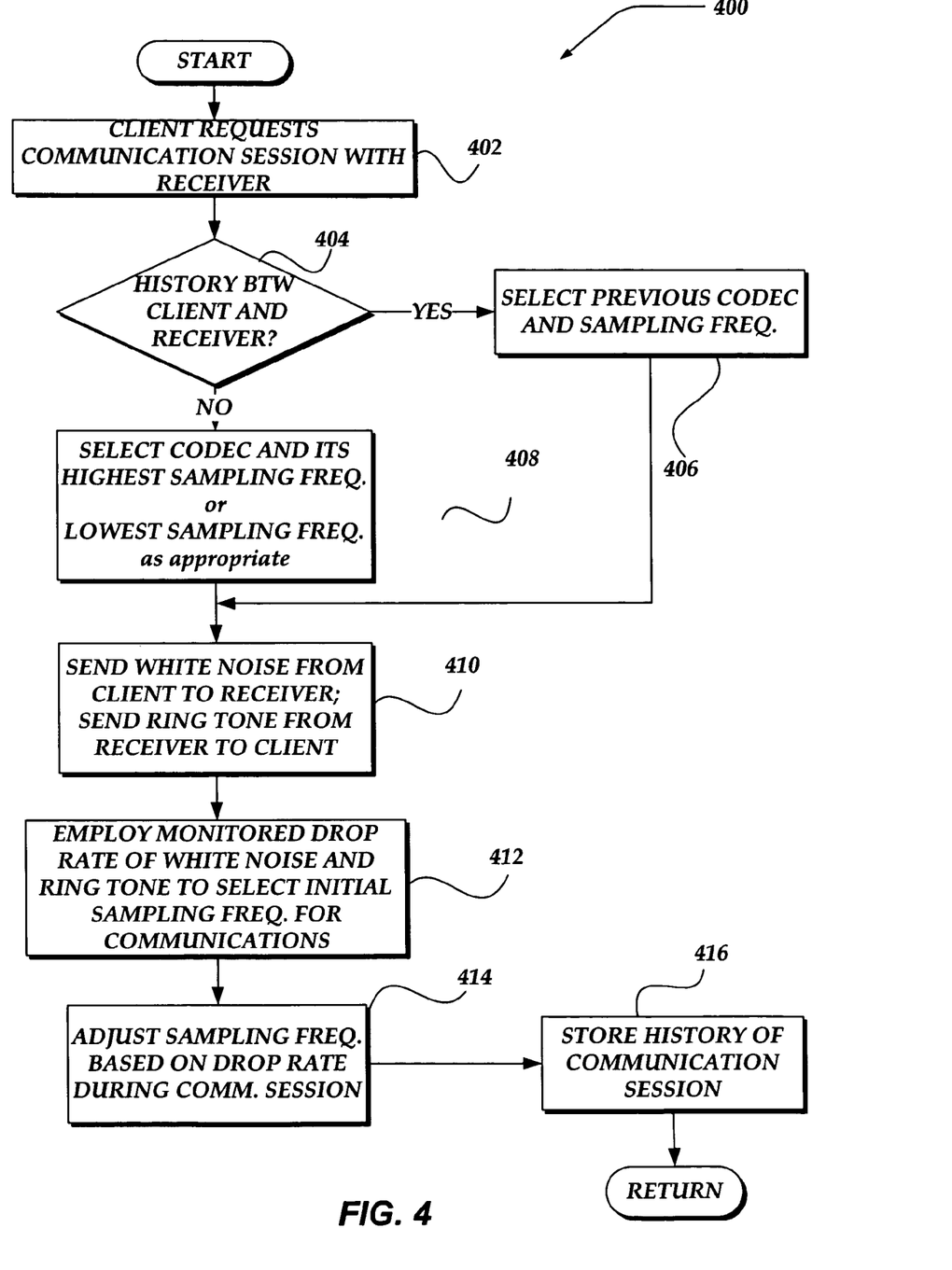
FIG. 4 illustrates a logical flow diagram generally showing one embodiment of a process for dynamically selecting a CODEC and its associated sampling frequency for a communication session between a client and a receiver.

The operation of certain aspects of the invention will now be described with respect to FIGS. 4-6. FIG. 4 illustrates a logical flow diagram generally showing one embodiment of a process for dynamically selecting a CODEC and its associated sampling frequency for a communication session between a client device and a receiver device. Process 400 of FIG. 4 may, for example, be performed within client device 102 or mobile device 103 of FIG. 1.

Process 400 begins, after a start block, at block 402, where the client device requests a communication session with a receiver device. Using FIG. 1 as an example, client device 102 may operate as the client device that requests a communication session with mobile device 103. Such request may be provided to IM connection server 120, SIP connection server 130, VRS 136, or the like.

Processing continues to decision block 404, where a determination is made whether there is historical data available about prior a communication session between the client device and the receiver device. If there is historical data, processing branches to block 406 where the historical data is employed to select an initial CODEC and its sampling frequency. The initial CODEC and sampling frequency may be determined based on a prior successful communication session, or virtually any other criteria. Processing continues next to block 410.

At block 408 a selection may be made of either the CODEC and its highest sampling frequency, bandwidth, voice quality or the like, or it can select the CODEC and its lowest sampling frequency, bandwidth, voice quality or the like. If the highest possible seating is chosen then it may scale down from the maximum to a more reasonable optimal value. On the other hand if a low value is selected then it may scale up to the most optimal value.

It is possible that for a given bandwidth, packet loss and network latency conditions we could have multiple CODECS that could work. In such a case the CODEC that has the best MOS or PESQ score that is useable to measure voice quality may be selected.

If it is identified that the network has significant jitter/packet loss then a CODEC that can be used under low bandwidth conditions may be selected. Further the selection factor may take the best possible CODEC that can operate under the noted network conditions.

Alternatively, if at decision block 404, historical data is unavailable, the initial CODEC and sampling frequency is selected based on predetermined criteria. For example, the initial CODEC and sampling frequency may be selected based on a communication's type, a determined sampling frequency, a network type, or the like. In one embodiment, the sampling frequency is set to a highest sampling frequency for the selected CODEC. Processing then continues to block 410.

At block 410, a signal is sent from the client device to the receiver device over the network. The signal may be virtually any signal useable to determine network conditions. In one embodiment, the signal is configured to approximate white noise. The signal may be provided over the network for a period sufficient to enable determination of a metric, including packet loss, packet drop rate, data latency, jitter, or the like. Virtually any network metric may be determined during this period. In addition, a ring tone back from the receiver device may also be employed to determine network metrics.

Process 400 continues next to block 412, where the determined metrics are employed to dynamically re-select as appropriate another sampling frequency for the selected CODEC. In one embodiment, a packet drop rate is employed to re-select the sampling frequency.

Processing continues to block 414, which is described in more detail below in conjunction with FIG. 5. Briefly, however, the sampling frequency, and potentially the CODEC, is dynamically adjusted based on determined metrics. Such determination may be performed during an entire communication session. In another embodiment, the dynamic selection of the CODEC and its sampling frequency is performed within an early portion of the communication session, such as during setup, and prior to an end-user actually communicating a message over the network. For example, in one embodiment, where the communication session is an audio communications, the dynamic selection may be performed prior to an end-user speaking over the network.

Processing flows next to block 416, which is described in more detail below in conjunction with FIG. 6. Briefly, however, at block 416, historical data for the current communication session is stored. Process 400 then returns to a calling process to perform other actions.

Figure 5:
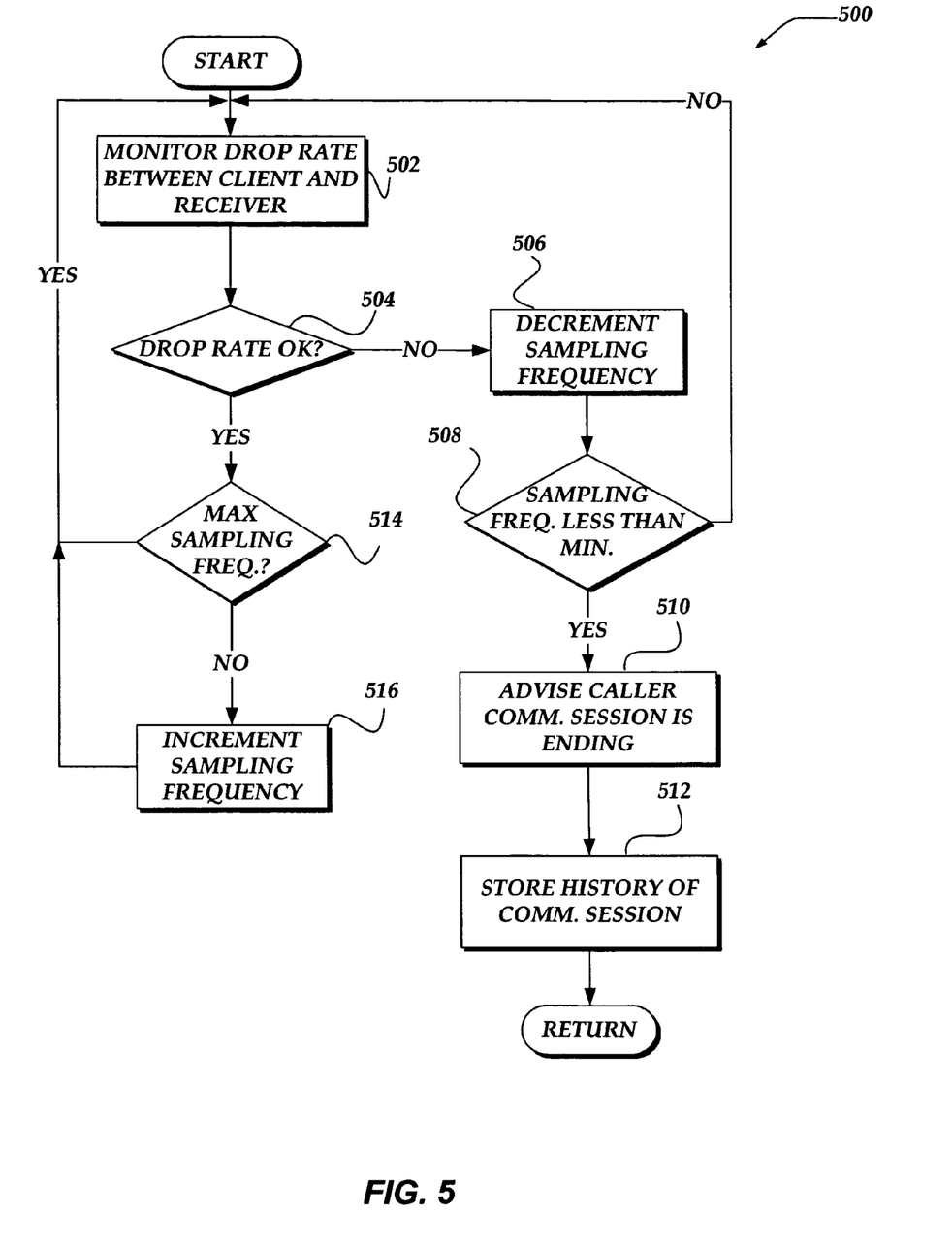
FIG. 5 illustrates a logical flow diagram generally showing one embodiment of a process for dynamically adjusting the CODEC's sampling frequency for the communication session based, in part, on a metric.

FIG. 5 illustrates a logical flow diagram generally showing one embodiment of a process for dynamically adjusting the CODEC's sampling frequency for the communication session based, in part, on the metric. As illustrated, a packet drop rate is employed as the metric. However, the invention is not so limited, and virtually any other metric may be employed, including packet loss, latency, jitter, or the like. Moreover, process 500 of FIG. 5 may, for example, represent block 414 of FIG. 4.

Process 500 begins, after a start block, at block 502, where a metric, such as packet drop rate, is monitored for the communication session between the client device and the receiver device. In one embodiment, the packet drop rate is monitored based on sending the approximated white noise from the client device to the receiver device. In another embodiment, additional metrics may be collected based on receiving at the client device a ring tone back from the receiver device. However, the invention is not constrained to these tests, and virtually any other mechanism may be employed to determine a metric associated with the communication session.

Processing next flows to decision block 504 where a determination is made whether the determined metric indicates a satisfactory communication session. For example, where the metric is a packet drop rate, the determination may be whether the drop rate is below a predetermined threshold. Such threshold may be set based on any of a variety of criteria, including the communication type, network type, engineering judgment, and the like. In any event, if it is determined that the metric is unsatisfactory, processing branches to block 506; otherwise, processing flows to decision block 514.

At block 506, the sampling frequency for the CODEC may be dynamically decremented by a predetermined value. Processing continues to decision block 508, where a determination is made whether the decremented sampling frequency is below a predetermined minimum value. The predetermined minimum value may be based on any of a variety of criteria, including a minimum value for the selected CODEC, a value based on a minimum quality of service for the communication session, or the like. In any event, if the sampling frequency is not below the minimum value, the process loops back to block 502 to continue monitoring. Otherwise, if the sampling is below the minimum value, processing proceeds to block 510, where a message may be provided to the client device advising termination of the communication session. In one embodiment, the communication session may be automatically terminated. In any event, processing proceeds to block 512, where data is stored for the current communication session. Processing then returns to a calling process to perform other actions.

Back at decision block 504, if it is determined that the metric is satisfactory, processing continues to decision block 514, where a determination is made whether the current sampling frequency is at a maximum sampling frequency for the selected CODEC. If it is at the maximum sampling frequency, processing loops back to block 502 to continue monitoring; otherwise, processing flows to block 516, where the sampling frequency is dynamically incremented by a predetermined amount. Processing then loops back to block 502.

It is noted that while the above process is described as dynamically adjusting a sampling frequency for a selected CODEC, the invention is not so constrained. For example, the invention may also dynamically select a different CODEC. For example, at decision block 514, if it is determined that the maximum sampling frequency is reached for the current CODEC, another faster CODEC may also be selected. In this manner, the invention is not constrained to a pre-selected CODEC, but may dynamically select and negotiate various CODECs to improve the quality and service of a communication session.

Figure 6:
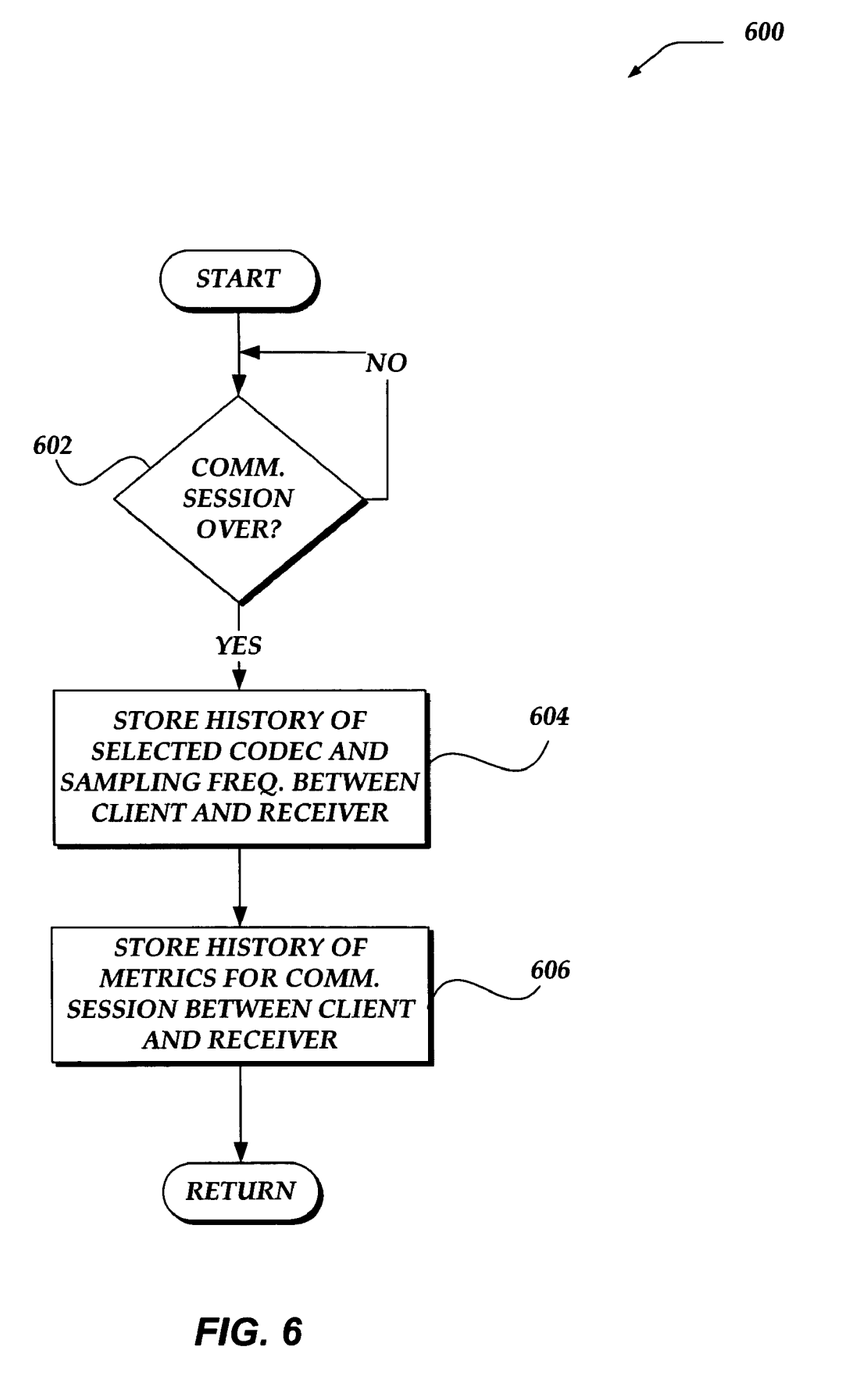
FIG. 6 illustrates a logical flow diagram generally showing one embodiment of a process for preserving historical data associated with the communication session of FIGS. 4-5, in accordance with the present invention.

FIG. 6 illustrates a logical flow diagram generally showing one embodiment of a process for preserving historical data associated with the communication session of FIGS. 4-5. Process 600 of FIG. 6 may, for example, represent block 416 of FIG. 4.

Process 600 begins, after a start block, at decision block 602, where a determination is made whether the current communication session is terminated. If it is, processing flows to block 604; otherwise, processing loops back through decision block 602, until the communication session is over.

At block 602, the selected CODEC, and its sampling frequency for the current communication session is stored. Processing flows next to block 606, where the determined metrics for the current communication session are also stored. In one embodiment, this information is stored on the client device. However, the invention is not so limited, and the information may also be stored on the receiver device, a server, or the like. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions. Moreover, at least some of the blocks of the flowchart illustration, and combinations of some of the blocks in the flowchart illustration, can also be implemented using a manual mechanism, without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for use in managing an audio communication session over a network, comprising:
    sending a request from a client device to a receiver device for the audio communication session with the receiver device;
    sending a signal from the client device over the network to the receiver device during a setup phase for setting up the audio communication session;
    based on an effect of the network on the signal, measuring at the client device that sent the signal a network metric, wherein the effect occurred during the sending of the signal over the network to the receiver device;
    employing the determined network metric, in part, to dynamically select by the client device a CODEC and a sampling frequency for the CODEC;
    if the network metric is above a predetermined value, decrementing the sampling frequency; and
    if the audio communication session is terminated, storing the determined network metric associated with the audio communication session.

2. The method of claim 1, wherein the signal approximates a white noise signal.

3. The method of claim 1, wherein the setup phase for setting up the audio communication session occurs before an end-user communicates data between the client device and the receiver device.

4. The method on claim 1 where the CODEC is selected for voice communication in instant messaging.

5. The method of claim 4, where the CODEC is selected from a voice mail message store that is integrated into an instant messaging client.

6. The method of claim 1, wherein the network metric is at least one of a packet loss, a packet drop rate, a packet latency, and a jitter metric.

7. The method of claim 1, wherein dynamically selecting the CODEC and sampling frequency further comprises selecting the CODEC based further on at least one of an audio communication type, or a network connection type.

8. The method of claim 1, further comprising:
    receiving a ring tone back from the receiver device; and
    determining the network metric based on the sent signal and a metric associated with the ring tone received from the receiver device.

9. The method of claim 1, wherein dynamically selecting the CODEC further comprises:
    if the sampling frequency is below a predetermined minimum value, providing a message advising that the audio communication session is terminating.

10. The method of claim 1, further comprising:
    if the network metric is below the predetermined value and below a maximum sampling frequency, incrementing the sampling frequency for the CODEC.

11. The method of claim 1, further comprising:
    if the network metric is below the predetermined value and above a maximum sampling frequency, dynamically selecting another CODEC.

12. The method of claim 1, wherein the method is operable on a client device.

13. The method of claim 1, wherein the method is implemented as computer-readable instructions that are integrated with other computer-readable instructions associated with an instant messaging application.

14. The method of claim 1, wherein the method is operable on a mobile device.

15. The method of claim 1, where storing the determined network metric further comprises storing the network metric on at least one of a client device requesting the communication session, or a server device.

16. The method of claim 1, where storing the determined network metric further comprises storing information associated with the dynamically selected CODEC, the sampling frequency, information associated with a client device requesting the communication session, and the receiver device.

17. The method of claim 1, wherein employing the determined network metric further includes selecting an initial CODEC and its sampling frequency based on another determined network metric, wherein the other determined network metric is based on an effect of the network on another signal that was transmitted between the client device and the receiver device in a prior communication session.

18. A client device for use in managing an audio communication session over a network, comprising:
    a transceiver for receiving and sending information to another computing device;
    a processor in communication with the transceiver; and a memory in communication with the processor and for use in storing data and machine instructions that causes the processor to perform a plurality of operations, including:
- requesting the audio communication session with a receiver device;
- sending a signal over the network to the receiver device during a setup phase for setting up the audio communication session;
- measuring a network metric based, at least in part, on an effect of the network on the sent signal, wherein the effect occurred during the sending of the signal over the network to the receiver device;
- employing the determined network metric, in part, to dynamically select a CODEC and a sampling frequency for the CODEC;
- if the network metric is above a predetermined value, decrementing the sampling frequency; and
- if the audio communication session is terminated, storing the determined network metric associated with the audio communication session.

19. The client device of claim 18, wherein the setup phase for setting up the audio communication session occurs before an end-user communicates data between the client device and the receiver device.

20. The client device of claim 18, wherein the network metric is at least one of a packet loss, a packet drop rate, a packet latency, and a jitter metric, and wherein the signal approximates white noise.

21. The client device of claim 18, wherein the client device is a mobile device.

22. The client device of claim 18, further comprising:
receiving a ring tone back from the receiver device; and
determining the network metric based on the sent signal and a metric associated with the ring tone received from the receiver device.

23. The client device of claim 18, wherein dynamically selecting the CODEC further comprises:
- if the sampling frequency is below a predetermined minimum value, providing a message advising that the audio communication session is terminating;
- if the network metric is below the predetermined value and below a maximum sampling frequency, incrementing the sampling frequency for the CODEC; and
- if the network metric is below the predetermined value and above the maximum sampling frequency, dynamically selecting another CODEC.

24. A non-transitory, computer readable storage medium for use in managing a communication session over a network comprising instructions, wherein when the instructions are executed, they perform actions comprising:
- requesting, from a client device, the communication session with a receiver device;
- sending, from the client device, a signal over the network to the receiver device during a setup phase for setting up the communication session, wherein the signal approximates white noise;
- measuring, at the client device, a network metric based, at least in part, on an effect of the network on the sent signal, wherein the effect occurred during the sending of the signal over the network to the receiver device;
- employing, at the client device, the determined network metric, in part, to dynamically select a CODEC and a sampling frequency for the CODEC, wherein the CODEC and sampling frequency are dynamically selected during a setup phase associated with the communication session;
- if the network metric is above a predetermined value, decrementing the sampling frequency; and
- if the communication session is terminated, storing the determined network metric associated with the communication session.

25. The non-transitory, computer readable storage medium of claim 24, wherein the communication session is at least one of an audio session, an IM session, streaming data session, or a video session.

26. An apparatus for managing a Voice over IP (VOIP) communication session over a network, comprising:
- a transceiver for receiving and sending information to a computing device over the network;
- means for requesting the VOIP communication session with a receiver device;
- means for sending a signal over the network to the receiver device during a setup phase for setting up the VOIP communication session;
- means for measuring a network metric based, at least in part, on an effect of the network on the sent signal, wherein the effect occurred during the sending of the signal over the network to the receiver device;
- means for employing the determined network metric, in part, to dynamically select a CODEC and a sampling frequency for the CODEC;
- if the network metric is above a predetermined value, means for decrementing the sampling frequency; and
- if the audio communication session is terminated, means for storing the determined network metric associated with the audio communication session.

* * * * *